United States Patent
Chiu et al.

(10) Patent No.: US 12,408,084 B2
(45) Date of Patent: Sep. 2, 2025

(54) WIRELESS COMMUNICATION DEVICE USING HIGHER PHYSICAL LAYER DATA RATE FOR CHANNEL STATE INFORMATION TRANSMISSION AND ASSOCIATED WIRELESS COMMUNICATION METHOD

(71) Applicant: MEDIATEK INC., Hsin-Chu (TW)

(72) Inventors: Po-Jung Chiu, Hsinchu (TW); Shun-Yong Huang, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 429 days.

(21) Appl. No.: 17/952,345

(22) Filed: Sep. 26, 2022

(65) Prior Publication Data
US 2023/0108796 A1    Apr. 6, 2023

Related U.S. Application Data

(60) Provisional application No. 63/252,199, filed on Oct. 5, 2021.

(51) Int. Cl.
*H04W 72/04* (2023.01)
*H04W 8/24* (2009.01)
*H04W 28/22* (2009.01)

(52) U.S. Cl.
CPC ............ *H04W 28/22* (2013.01); *H04W 8/24* (2013.01)

(58) Field of Classification Search
CPC ........ H04W 28/22; H04W 8/24; H04L 1/0026
See application file for complete search history.

(56) References Cited

U.S. PATENT DOCUMENTS

| | | | |
|---|---|---|---|
| 11,483,046 B1* | 10/2022 | Tsai | H04L 1/203 |
| 2003/0086371 A1* | 5/2003 | Walton | H04L 1/0026 |
| | | | 370/235 |
| 2012/0195213 A1* | 8/2012 | Tan | H04L 5/0053 |
| | | | 370/252 |
| 2014/0241226 A1* | 8/2014 | Jia | H04W 48/14 |
| | | | 370/311 |
| 2014/0269377 A1 | 9/2014 | Jia | |

(Continued)

FOREIGN PATENT DOCUMENTS

| | | |
|---|---|---|
| WO | 2017/168396 A1 | 10/2017 |
| WO | 2020/213964 A1 | 10/2020 |

OTHER PUBLICATIONS

IEEE Standard for Information technology—Telecommunications and information exchange between systems—Local and metropolitan area networks—Specific requirements, Part 11: Wireless LAN Medium Access Control (MAC) and Physical Layer (PHY) Specifications, Amendment 5: Enhancements for higher Throughput, Oct. 29, 2009, pp. i-xxxii and 1-502, IEEE Std 802.11nTM-2009 (Amendment to IEEE Std 802.11TM-2007), IEEE Computer Society, New York, USA, XP017694836, Oct. 29, 2009.

*Primary Examiner* — Mahbubul Bar Chowdhury
(74) *Attorney, Agent, or Firm* — Winston Hsu

(57) ABSTRACT

A wireless communication device includes a channel state information (CSI) estimation circuit and a transmitter (TX) circuit. The CSI estimation circuit performs CSI estimation for generating CSI data. The TX circuit transmits a first frame at a specific physical layer (PHY) data rate to another wireless communication device. The first frame carries the CSI data. The specific PHY data rate is higher than a basic PHY data rate for normal acknowledgement (ACK) frame transmission.

17 Claims, 5 Drawing Sheets

(56) References Cited

U.S. PATENT DOCUMENTS

| | | | |
|---|---|---|---|
| 2016/0234704 A1* | 8/2016 | Aldana | H04L 43/0864 |
| 2016/0316424 A1* | 10/2016 | Jia | H04W 48/18 |
| 2018/0124866 A1 | 5/2018 | Asterjadhi | |
| 2019/0109626 A1* | 4/2019 | Park | H04B 7/0658 |
| 2019/0253184 A1* | 8/2019 | Xing | H04L 1/0026 |
| 2021/0219166 A1* | 7/2021 | Morozov | H04W 8/24 |
| 2022/0029748 A1* | 1/2022 | Fu | H04L 1/1861 |
| 2022/0183030 A1* | 6/2022 | Lee | H04L 5/005 |
| 2022/0368397 A1* | 11/2022 | Bao | H04L 1/1864 |
| 2023/0179503 A1* | 6/2023 | Min | H04W 24/10 370/252 |

* cited by examiner

WIRELESS COMMUNICATION DEVICE USING HIGHER PHYSICAL LAYER DATA RATE FOR CHANNEL STATE INFORMATION TRANSMISSION AND ASSOCIATED WIRELESS COMMUNICATION METHOD

CROSS REFERENCE TO RELATED APPLICATIONS

This application claims the benefit of U.S. provisional application No. 63/252,199, filed on Oct. 5, 2021 and incorporated herein by reference.

BACKGROUND

The present invention relates to wireless communications, and more particularly, to a wireless communication device using a higher physical layer (PHY) data rate for channel state information (CSI) transmission and an associated wireless communication method.

Wireless fidelity (Wi-Fi) has a very rapid growth with the increasing popularity of wireless devices. While the deployment of 802.11 wireless local area networks (WLANs) is continuously increasing, the demand for reliable high bandwidth WLANs is exploding due to the demands of applications. The optimal 802.11 WLAN performance requires detailed knowledge of the wireless channel. Such information is available through the use of channel state information (CSI), which describes the current condition of the wireless channel. For example, CSI can be determined by analyzing received packets using training sequences in the packet headers. Wireless signals experience transformations such as amplitude and phase changes while traveling over the air from a transmitter end to a receiver end. Specifically, when one Wi-Fi device transfers packets to the other Wi-Fi device, the Wi-Fi signal propagation will be changed by a channel matrix that can be estimated as CSI. For example, a simple model is expressed as y=Hx+n, where y represents the received data, x represents the transmitted data, H represent the channel matrix, and n represent the noise. A simple model of the channel matrix H may be expressed as H=a+bi, where a represent a real part (amplitude variation), and b represents an imaginary part (phase variation).

Recently, CSI measurements from Wi-Fi systems are used for different sensing purposes. Wi-Fi based sensing reuses the infrastructure that is used for wireless communication, so it is easy to deploy and has low cost. Moreover, unlike sensor-based and video-based solutions, Wi-Fi based sensing is not intrusive or sensitive to lighting conditions. The performance of the Wi-Fi based sensing application depends on the amount of CSI information. In accordance with the standard Wi-Fi protocol, the basic physical layer (PHY) data rate (802.11a/g) is used to send the acknowledgement (ACK) frame, which ensures that the bit error rate is low and a peer device does not miss the ACK frame. If the ACK frame is transmitted at the non-HT (high throughput) rate, that is, the basic PHY data rate (802.11a/g), the CSI data carried by the ACK frame is transmitted via a single stream (1ss) and a small number of usable subcarriers (e.g. 48 usable subcarriers among total 52 subcarriers). As a result, the CSI data amount available to the Wi-Fi based sensing application is low, thus resulting in degradation of the performance of the Wi-Fi based sensing application.

Thus, there is a need for an innovative CSI transmission scheme which can provide more CSI data to a wireless communication device for enhancing the performance of a specific application (e.g. Wi-Fi based sensing application).

SUMMARY

One of the objectives of the claimed invention is to provide a wireless communication device using a higher physical layer (PHY) data rate for channel state information (CSI) transmission and an associated wireless communication method.

According to a first aspect of the present invention, an exemplary wireless communication device is disclosed. The exemplary wireless communication device includes a channel state information (CSI) estimation circuit and a transmitter (TX) circuit. The CSI estimation circuit is arranged to perform CSI estimation for generating CSI data. The TX circuit is arranged to transmit a first frame at a specific physical layer (PHY) data rate to another wireless communication device, wherein the first frame carries the CSI data, and the specific PHY data rate is higher than a basic PHY data rate for normal acknowledgement (ACK) frame transmission.

According to a second aspect of the present invention, an exemplary communication device is disclosed. The exemplary wireless communication device includes a receiver (RX) circuit. The RX circuit is arranged to receive a first frame transmitted at a specific physical layer (PHY) data rate from another wireless communication device, wherein the first frame carries channel state information (CSI) data, and the specific PHY data rate is higher than a basic PHY data rate for normal acknowledgement (ACK) frame transmission.

According to a third aspect of the present invention, an exemplary wireless communication method is disclosed. The exemplary wireless communication method includes: performing channel state information (CSI) estimation for generating CSI data; and transmitting a first frame at a specific physical layer (PHY) data rate to a wireless communication device, wherein the first frame carries the CSI data, and the specific PHY data rate is higher than a basic PHY data rate for normal acknowledgement (ACK) frame transmission.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
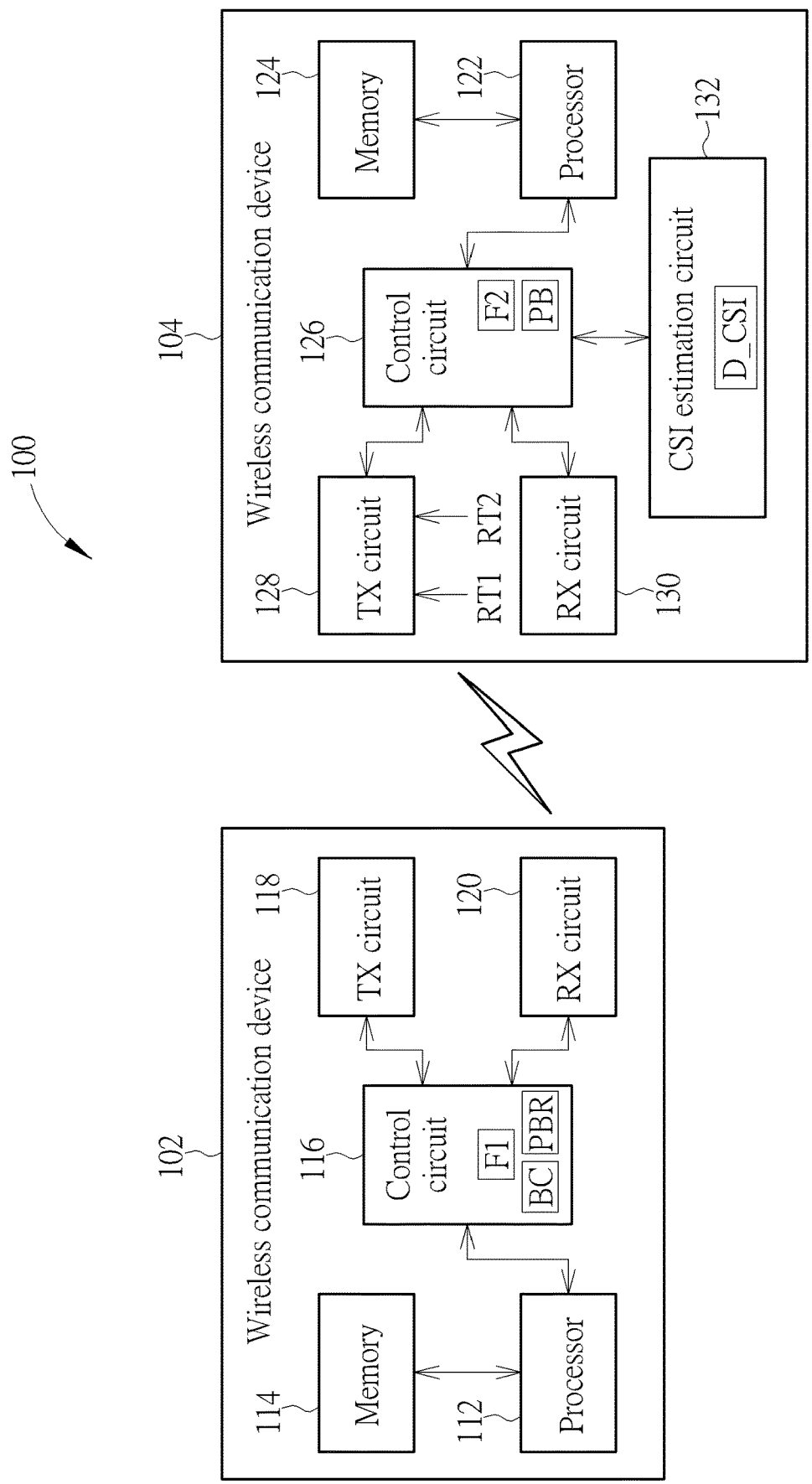
FIG. 1 is a diagram illustrating a wireless fidelity (Wi-Fi) system according to an embodiment of the present invention.

FIG. 1 is a diagram illustrating a wireless fidelity (Wi-Fi) system according to an embodiment of the present invention. The Wi-Fi system 100 is an 802.11 wireless local area network (WLAN), and has a plurality of wireless communication devices 102 and 104. For brevity and simplicity, only two wireless communication devices are illustrated. In practice, the Wi-Fi system 100 may include more than two wireless communication devices. By way of example, but not limitation, the Wi-Fi system 100 may be a high throughput (HT) WLAN (802.11n), a very high throughput (VHT) WLAN (802.11ac), a high efficiency (HE) WLAN (802.11ax), or an extremely high throughput (EHT) WLAN (802.11be). In this embodiment, one of the wireless communication devices 102 and 104 may be an access point (AP), and the other of the wireless communication devices 102 and 104 may be a non-AP station (STA). For example, the wireless communication device 102 may act as an AP, and the wireless communication device 104 may act as a non-AP STA. For another example, the wireless communication device 102 may act as a non-AP STA, and the wireless communication device 104 may act as an AP.

As shown in FIG. 1, the wireless communication device 102 includes a processor 112, a memory 114, a control circuit 116, a transmitter (TX) circuit 118, and a receiver (RX) circuit 120, and the wireless communication device 104 includes a processor 122, a memory 124, a control circuit 126, a TX circuit 128, an RX circuit 130, and a channel state information (CSI) estimation circuit 132. Each of the wireless communication devices 102 and 104 may be equipped with one or more antennas (not shown), depending upon actual design considerations. Similarly, each of the TX circuits 118 and 128 may include one or more transmitters, and each of the RX circuits 120 and 130 may include one or more receivers.

Regarding the wireless communication device 102, the memory 114 is arranged to store a program code, the processor 112 is arranged to load and execute the program code to manage the wireless communication device 102, and the control circuit 116 is arranged to control wireless communications with the wireless communication device 104 via the TX circuit 118 and the RX circuit 120. Regarding the wireless communication device 104, the memory 124 is arranged to store a program code, the processor 122 is arranged to load and execute the program code to manage the wireless communication device 104, the control circuit 126 is arranged to control wireless communications with the wireless communication device 102 via the TX circuit 128 and the RX circuit 130, and the CSI estimation circuit 132 is arranged to perform CSI estimation to generate CSI data D_CSI. For example, the wireless communication device 102 may transmit training sequences (or known symbols) to the wireless communication device 104, and the wireless communication device 104 refers to the transmitted data of training sequences (or known symbols) and the received data of training sequences (or known symbols) to estimate the channel status between the wireless communication devices 102 and 104 for getting a channel matrix H as the CSI data D_CSI.

In this embodiment, the TX circuit 128 is controlled by the control circuit 126 to transmit a frame F2 at a specific physical layer (PHY) data rate RT2 to the wireless communication device 102, wherein the frame F2 carries the CSI data D_CSI estimated at the wireless communication device 104 (particularly, CSI estimation circuit 132 of wireless communication device 104), and the specific PHY data rate RT2 is intentionally set to be higher than a basic PHY data rate RT1 (which is a non-HT data rate) for normal acknowledgement (ACK) frame transmission. It means that the normal ACK frame is transmitted by basic data rate (such as RT1), and the frame F2 that carries the CSI data D_CSI is transmitted by specific data rate RT2, wherein the specific data rate is larger than the basic data rate. For example, the basic PHY data rate RT1 per stream may be set by the 802.11a/g PHY data rate, and the specific PHY data rate RT2 per stream may be set by the 802.11n/802.11ac/802.11ax/802.11be PHY data rate under a channel bandwidth 20 MHz/40 MHz/80 MHz/160 MHz/320 MHz. Compared to transmitting the frame F2 (which carries the CSI data D_CSI) at the 802.11a/g PHY data rate, transmitting the frame F2 (which carries the CSI data D_CSI) at the 802.11n/802.11ac/802.11ax/802.11be PHY data rate can use more subcarriers (tones) for CSI transmission.

Figure 2:
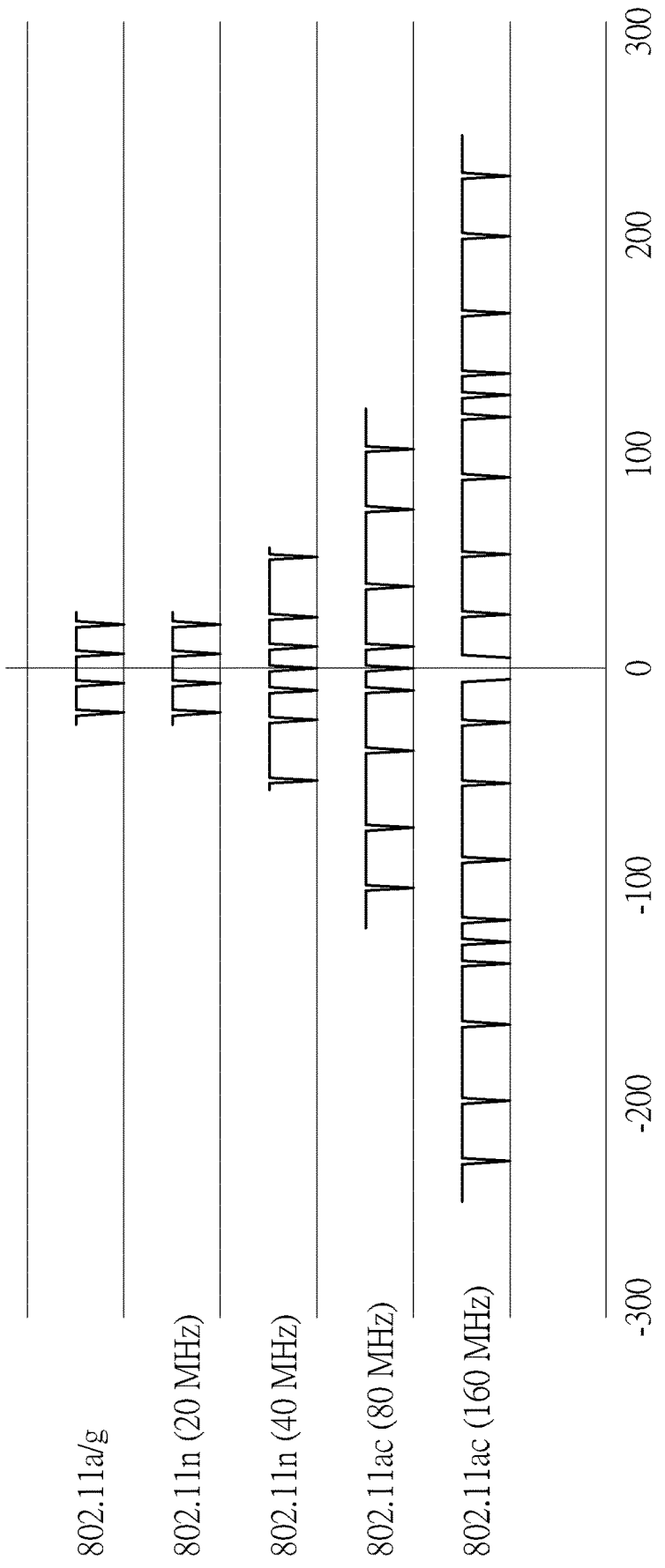
FIG. 2 is a diagram illustrating subcarrier (tone) distribution of different PHY standards supported by wireless communication devices shown in FIG. 1.

FIG. 2 is a diagram illustrating subcarrier (tone) distribution of different PHY standards supported by the wireless communication devices 102 and 104 shown in FIG. 1. Taking the 802.11a/g PHY standard for example, there are 48 usable subcarriers among the total 52 subcarriers within a subcarrier range −26 to −1 and +1 to +26, where the pilot subcarriers are at ±7 and ±21. Taking the 802.11ac (80 MHz) PHY standard for example, there are 234 usable subcarriers among the total 242 subcarriers within a subcarrier range −122 to −2 and +2 to +122, where the pilot subcarriers are at ±11, ±39, ±75 and ±103. Hence, compared to the conventional CSI transmission at the 802.11a/g PHY data rate, the proposed CSI transmission at the 802.11ac (80 MHz) PHY data rate can allow a peer device (e.g. wireless communication device 102) to get more CSI information. In this way, the performance of a specific application (e.g. Wi-Fi based sensing application) can be enhanced greatly.

In some embodiments of the present invention, the frame F2 (which carries the CSI data D_CSI) may be transmitted under a SISO (single input single output) mode or a MIMO (multiple input multiple output) mode. In a case where the frame F2 (which carries the CSI data D_CSI) is transmitted under a MIMO mode, more streams can be used for CSI transmission, thus leading to a higher CSI throughput. However, this is for illustrative purposes only, and is not meant to be a limitation of the present invention. Any Wi-Fi device using a higher PHY data rate RT2 (RT2>RT1) to transmit a specific frame (e.g. an advanced ACK frame as proposed by the present invention) for CSI transmission falls within the scope of the present invention.

In the Wi-Fi scenario, the control circuit 116 of the wireless communication device 102 controls the TX circuit 118 to transmit a frame F1, and the RX circuit 130 of the wireless communication device 104 receives the frame F1, and then the control circuit 126 of the wireless communication device 104 controls the TX circuit 128 to generate and transmit the frame F2 (which carriers the CSI data D_CSI) in response to the frame F1. In other words, the frame F1 can be set by the wireless communication device 102 to trigger the wireless communication device 104 to employ the specific PHY data rate RT2 for CSI transmission. For example, the frame F1 may be a management frame or data frame, and the frame F2 generated in response to the management frame or data frame may be a control frame such as an ACK frame or a block ACK (BA) frame. For another example, the frame F1 may be a control frame such as a request to send (RTS) frame, and the frame F2 generated in response to the control frame (e.g. RTS frame) may be a control frame such as a clear to send (CTS) frame. Hence, the wireless communication device 102 can get the CSI data D_CSI dumped from the ACK frame/BA frame/CTS frame without using any specific protocol.

Before the wireless communication device 104 initiates the process of transmitting the frame F2 (which carries the CSI data D_CSI) at the specific PHY data rate RT2, the wireless communication device 104 may need to know that the wireless communication device 102 has the capability of decoding the CSI data D_CSI transmitted at the specific PHY data rate RT2 that is different from (particularly, higher than) the basic PHY data rate RT1 specified for normal ACK frame transmission. Furthermore, before the wireless communication device 104 initiates the process of transmitting the frame F2 (which carries the CSI data D_CSI) at the specific PHY data rate RT2, the wireless communication device 104 may also need to check if transmission of the frame F2 (which carries the CSI data D_CSI) at the specific PHY data rate RT2 is requested by the wireless communication device 102. In other words, the wireless communication device 104 does not transmit the CSI data D_CSI at the specific PHY data rate RT2 unless the wireless communication device 102 has the capability of decoding the CSI data D_CSI transmitted at the specific PHY data rate RT2 and requests transmission of the CSI data D_CSI at the specific PHY data rate RT2.

Figure 3:
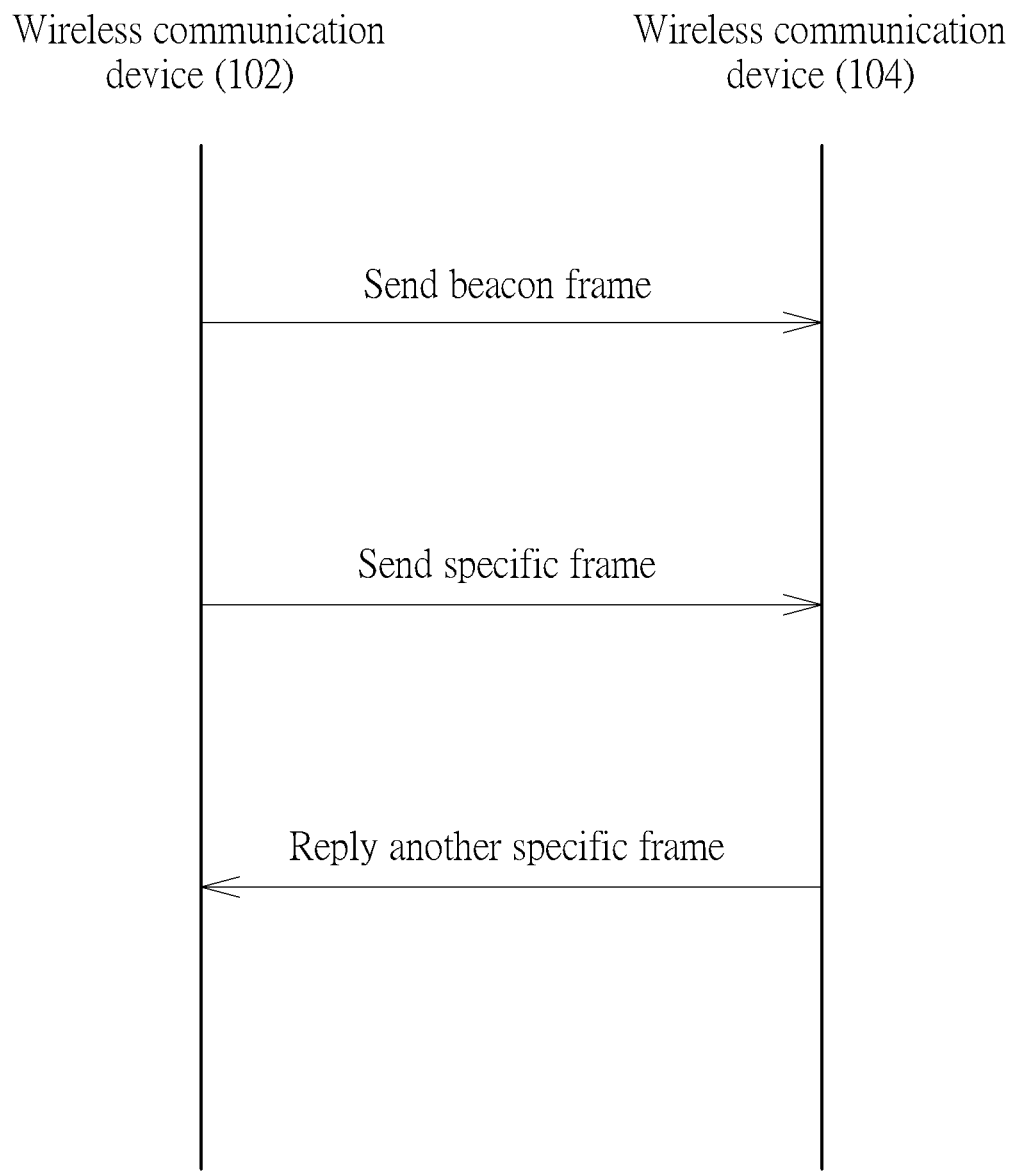
FIG. 3 is a sequence diagram illustrating interactions between wireless communication devices shown in FIG. 1 according to an embodiment of the present invention.

Please refer to FIG. 1 in conjunction with FIG. 3. FIG. 3 is a sequence diagram illustrating interactions between the wireless communication devices 102 and 104 shown in FIG. 1 according to an embodiment of the present invention. The control circuit 116 of the wireless communication device 102 controls the TX circuit 118 to broadcast a beacon frame BC, thereby sending the beacon frame BC to the wireless communication device 104 in the Wi-Fi system 100. In this embodiment, the beacon frame BC includes a vendor information element (IE), and the vendor IE is set by the control circuit 116 to indicate that the wireless communication device 102 has the capability of processing the first frame F1 to obtain the CSI data D_CSI transmitted at the specific PHY data rate RT2. Hence, after the RX circuit 130 of the wireless communication device 104 receives the beacon frame BC, the control circuit 126 refers to the vendor IE to know that the wireless communication device 102 has the capability of processing the first frame F1 to obtain the CSI data D_CSI transmitted at the specific PHY data rate RT2.

After the beacon frame BC is sent, the control circuit 116 of the wireless communication device 102 controls the TX circuit 118 to transmit a specific frame (e.g., frame F1) to the wireless communication device 104 for triggering the wireless communication device 104 to employ the specific PHY data rate RT2 for CSI transmission.

Figure 4:
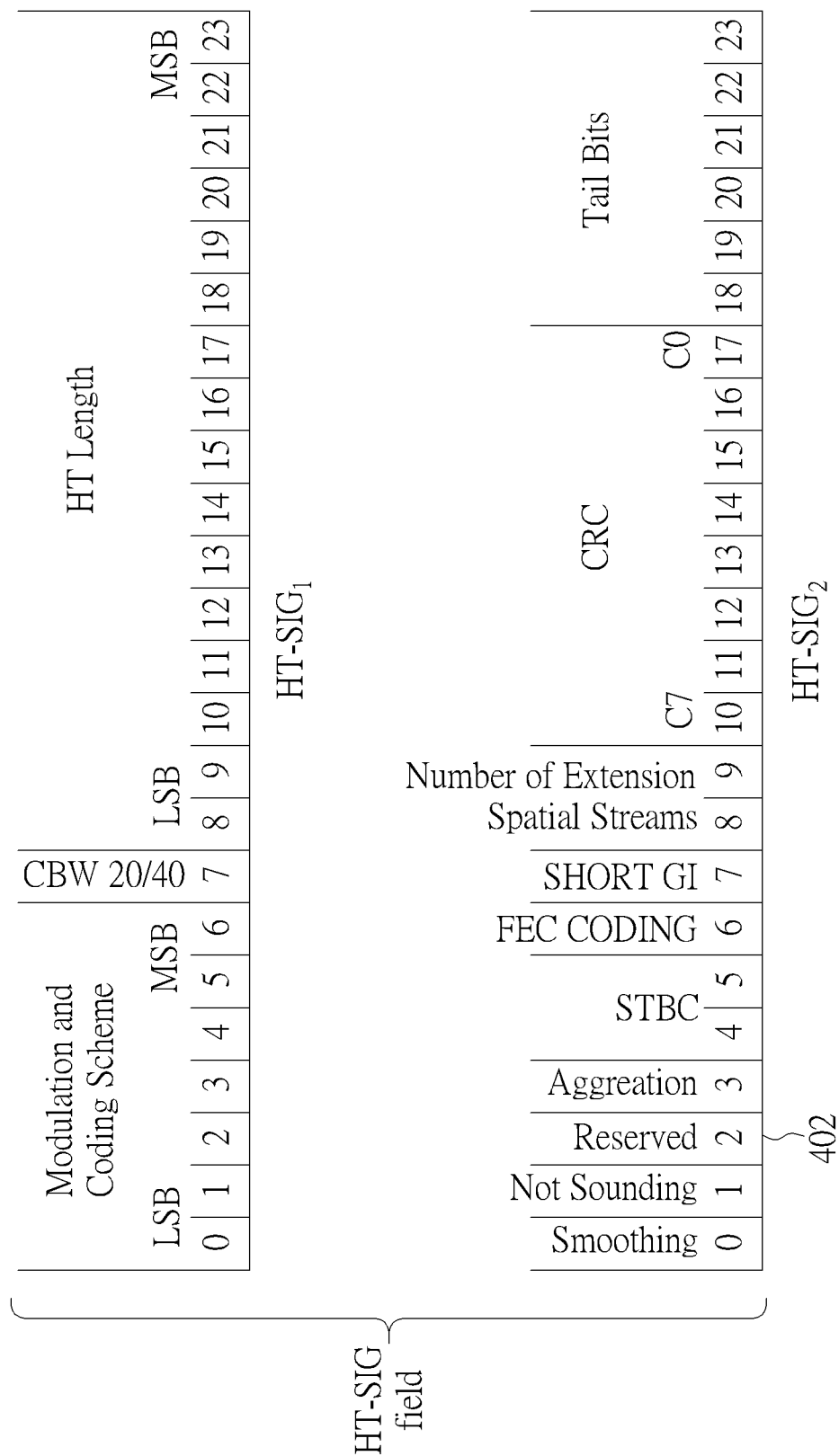
FIG. 4 is a diagram illustrating a format of an HT-SIG field consisting of HT-SIG$_1$ and HT-SIG$_2$ (which has one reserved bit that can be set to trigger CSI transmission at the specific PHY data rate RT2).

In a first exemplary design, the frame F1 has at least one PHY preamble reserved bit that is set to trigger the wireless communication device 104 to employ the specific PHY data rate RT2 for responding with another specific frame (e.g. frame F2). FIG. 4 is a diagram illustrating a format of an HT-SIG field consisting of HT-SIG$_1$ and HT-SIG$_2$ (which has one reserved bit that can be set to trigger CSI transmission at the specific PHY data rate RT2). For HT (802.11n) frame type, the HT preamble has one reserved bit 402 that can be set to trigger transmission of the specific frame (e.g., frame F2) at the specific PHY data rate RT2, without affecting the normal ACK scenario.

In a second exemplary design, the frame F1 has at least one medium access control (MAC) header reserved bit that is set to trigger the wireless communication device 104 to employ the specific PHY data rate RT2 for responding with another specific frame (e.g. frame F2). Table 1 shows the use of address fields in data frames.

TABLE 1

| Function | ToDS | FromDS | Address 1 (RX) | Address 2 (TX) | Address 3 | Address 4 |
|---|---|---|---|---|---|---|
| IBSS | 0 | 0 | DA | SA | BSSID | Not used |
| To AP (infra.) | 1 | 0 | BSSID | SA | DA | Not used |
| From AP (infra.) | 0 | 1 | DA | BSSID | SA | Not used |
| WDS (bridge) | 1 | 1 | RA | TA | DA | SA |

Hence, the unused MAC header address field (e.g. address field 4) can be set to trigger transmission of the specific frame (e.g., frame F1) at the specific PHY data rate RT2, without affecting the normal ACK scenario.

In a third exemplary design, the frame F1 has a specific frame type and contains a sequence control field, and the sequence control field records a sequence number that is set to trigger the wireless communication device 104 to employ the specific PHY data rate RT2 for responding with another specific frame (e.g. frame F2). For example, the frame F1 is a null data frame, and the sequence number recorded in the sequence control field is set by "0xff".

In a fourth exemplary design, the frame F1 includes a network allocation vector (NAV) duration field that is set to trigger the wireless communication device 104 to employ the specific PHY data rate RT2 for responding with another specific frame (e.g. frame F2). For example, the frame F1 may be an RTS frame. Table 2 shows the duration/ID field encoding.

TABLE 2

| Bits 0-13 | Bit 14 | Bit 15 | Usage |
|---|---|---|---|
| 0-32767 | | 0 | Duration value (in microseconds) within all frames other than PS-Poll frames transmitted during the CP, and under HCF for frames transmitted during the CFP |
| 0 | 0 | 1 | Fixed value under point coordination function (PCF) within frames transmitted during the CFP |
| 1-16383 | 0 | 1 | Reserved |
| 0 | 1 | 1 | Reserved |
| 1-2007 | 1 | 1 | AID in PS-Poll frames |
| 2008-16383 | 1 | 1 | Reserved |

Hence, in order to trigger transmission of the specific frame (e.g., frame F1) at the specific PHY data rate RT2, bits 0-14 of the NAV duration field included in the RTS frame may be set by a least frequently used value such as 32766, and bit 15 of the NAV duration field included in the RTS frame may be set by a value equal to 0. Alternatively, the NAV duration field included in the RTS frame may be set by a reserved value to trigger transmission of the specific frame (e.g., frame F1) at the specific PHY data rate RT2. For example, in order to trigger transmission of the specific frame (e.g., frame F1) at the specific PHY data rate RT2, bits 0-13 of the NAV duration field included in the RTS frame may be set by a value selected from 1-16383, bit 14 of the NAV duration field included in the RTS frame may be set by a value equal to 0, and bit 15 of the NAV duration field included in the RTS frame may be set by a value equal to 1. For another example, in order to trigger transmission of the specific frame (e.g., frame F1) at the specific PHY data rate RT2, bits 0-13 of the NAV duration field included in the RTS frame may be set by a value equal to 0, bit 14 of the NAV duration field included in the RTS frame may be set by a value equal to 1, and bit 15 of the NAV duration field included in the RTS frame may be set by a value equal to 1. For yet another example, in order to trigger transmission of the specific frame (e.g., frame F1) at the specific PHY data rate RT2, bits 0-13 of the NAV duration field included in the RTS frame may be set by a value selected from 2008-16383, bit 14 of the NAV duration field included in the RTS frame may be set by a value equal to 1, and bit 15 of the NAV duration field included in the RTS frame may be set by a value equal to 1.

After the RX circuit 130 of the wireless communication device 104 receives the specific frame (e.g. frame F1) sent from the wireless communication device 102, the control circuit 126 controls the TX circuit 128 to employ the specific PHY data rate RT2 to transmit another specific frame (e.g., frame F2) to the wireless communication device 102. Specifically, after being notified of the CSI decoding capability of the wireless communication device 102 and trigged by the specific frame (e.g. frame F1) sent from the wireless communication device 102, the wireless communication device 104 initiates a process of transmitting another specific frame (e.g. frame F2) at the specific PHY data rate RT2 for letting the wireless communication device 102 get more CSI information.

Figure 5:
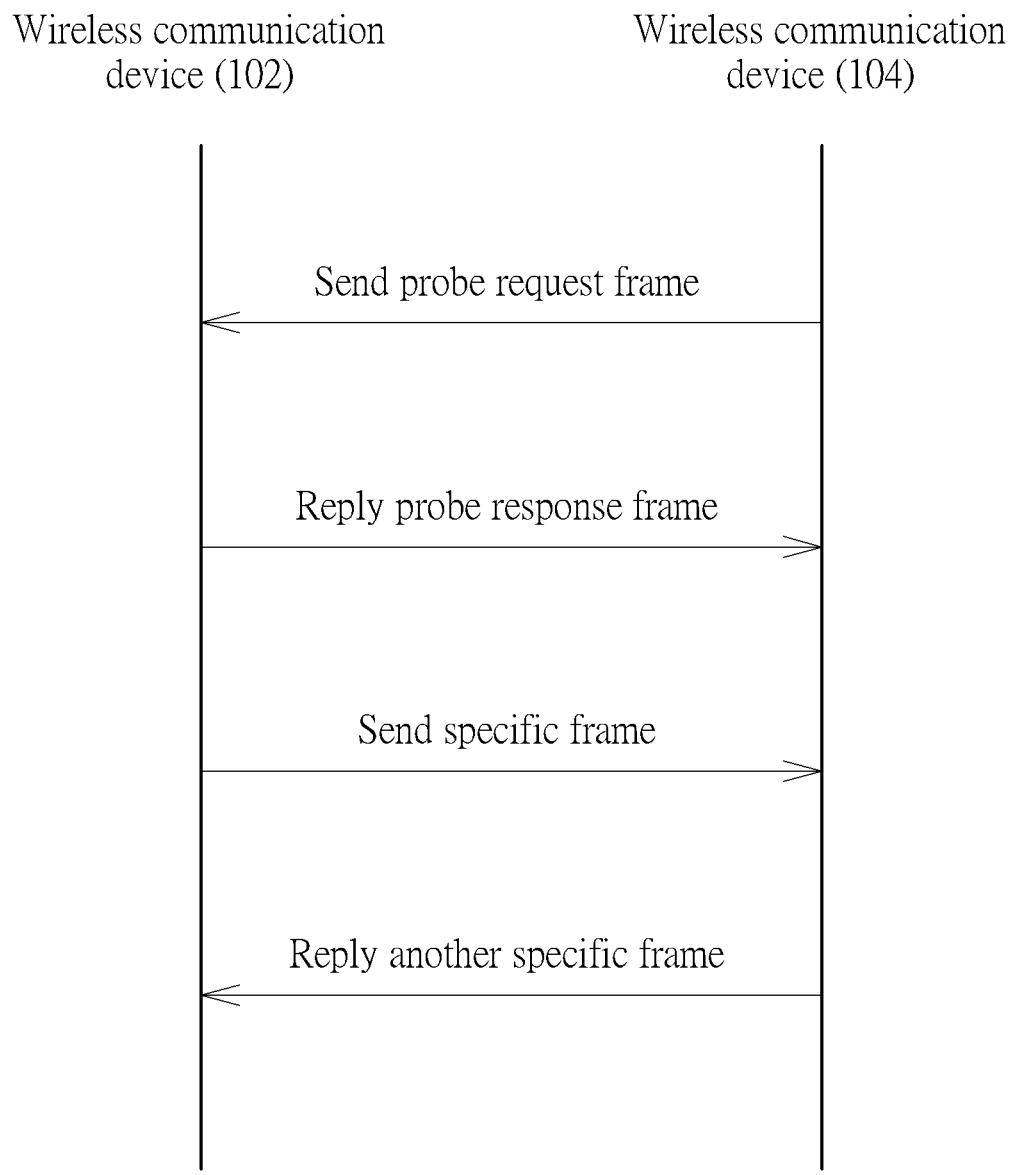
FIG. 5 is another sequence diagram illustrating interactions between wireless communication devices shown in FIG. 1 according to an embodiment of the present invention.

In the above embodiment, the wireless communication device 102 actively sends the beacon frame BC to announce its CSI decoding capability, that is, the wireless communication device 104 is passively informed of the CSI decoding capability of the wireless communication device 102. However, this is for illustrative purposes only, and is not meant to be a limitation of the present invention. Please refer to FIG. 1 in conjunction with FIG. 5. FIG. 5 is another sequence diagram illustrating interactions between the wireless communication devices 102 and 104 shown in FIG. 1 according to an embodiment of the present invention. The control circuit 126 of the wireless communication device 104 controls the TX circuit 128 to send a probe request frame PB to the wireless communication device 102. After the RX circuit 120 of the wireless communication device 102 receives the probe request frame PB, the control circuit 116 controls the TX circuit 118 to send a probe response frame PBR to the wireless communication device 104. In this embodiment, the probe response frame PBR includes a vendor IE, and the vendor IE is set by the control circuit 116 to indicate that the wireless communication device 102 has the capability of processing the first frame F1 to obtain the CSI data D_CSI transmitted at the specific PHY data rate RT2. Hence, after the RX circuit 130 of the wireless communication device 104 receives the probe response frame PBR, the control circuit 126 of the wireless communication device 104 refers to the vendor IE to know that the wireless communication device 102 has the capability of processing the first frame F1 to obtain the CSI data D_CSI transmitted at the specific PHY data rate RT2.

Similarly, after the probe response frame PBR is sent, the control circuit 116 of the wireless communication device 102 controls the TX circuit 118 to transmit a specific frame (e.g., frame F1) to the wireless communication device 104 for triggering the wireless communication device 104 to employ the specific PHY data rate RT2 for CSI transmission. The specific frame (e.g., frame F1) may be set by using one of the aforementioned designs for triggering CSI transmission at the specific PHY data rate RT2. After the RX circuit 130 of the wireless communication device 104 receives the specific frame (e.g. frame F1) sent from the wireless communication device 102, the control circuit 126 controls the TX circuit 128 to employ the specific PHY data rate RT2 to transmit another specific frame (e.g., frame F2) to the wireless communication device 102. For brevity, similar descriptions are omitted here.

It should be noted that, assuming that the wireless communication device 102 is replaced with a conventional wireless communication device that does not support the proposed high-performance CSI transmission scheme, the wireless communication device 104 operates under a normal mode for dealing with all normal management/data/control frames sent from the wireless communication device 102, and does not initiate the process of transmitting the CSI data D_CSI at the specific PHY data rate RT2. Furthermore, assuming that the wireless communication device 104 is replaced with a conventional wireless communication device that does not support the proposed high-performance CSI transmission scheme, the wireless communication device 104 treats the beacon frame BC (which has a vendor IE set to indicate CSI decoding capability of the wireless communication device 104) sent from the wireless communication device 102 as a normal beacon frame, and treats the specific frame F1 (which has reserved bit(s), specific sequence number, or NAV duration field set to trigger CSI transmission at the specific PHY data rate RT2) sent from the wireless communication device 102 as a normal management/data/control frame. To put is simply, when the Wi-Fi system 100 includes wireless communication devices 102 and 104 that support CSI transmission at a higher PHY data rate and conventional wireless communication devices that support CSI transmission at a basic PHY data rate (802.11a/g), the proposed high-performance CSI transmission scheme does not interfere with normal operations of the conventional wireless communication devices.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:
1. A wireless communication device comprising:
 a channel state information (CSI) estimation circuit, arranged to perform CSI estimation for generating CSI data;
 a transmitter (TX) circuit, arranged to transmit a first frame at a first physical layer (PHY) data rate to another wireless communication device, wherein the first frame carries the CSI data, and the first PHY data rate is higher than a second PHY data rate for acknowledgement (ACK) frame transmission;

a receiver (RX) circuit, arranged to receive a second frame from said another wireless communication device;

wherein the wireless communication device generates and transmits the first frame to said another wireless communication device in response to the second frame, and the second frame has at least one PHY preamble reserved bit that is set to trigger the wireless communication device to employ the first PHY data rate for transmitting the first frame.

2. The wireless communication device of claim 1, wherein the RX circuit is further arranged to receive a beacon frame sent from said another wireless communication device, the beacon frame comprises a vendor information element (IE), and the vendor IE indicates that said another wireless communication device has the capability of processing the first frame to obtain the CSI data transmitted at the first PHY data rate.

3. The wireless communication device of claim 1, wherein the TX circuit is further arranged to transmit a probe request frame to said another wireless communication device, the RX circuit is further arranged to receive a probe response frame sent from said another wireless communication device in response to the probe request frame, the probe response frame comprises a vendor information element (IE), and the vendor IE indicates that said another wireless communication device has the capability of processing the first frame to obtain the CSI data transmitted at the first PHY data rate.

4. The wireless communication device of claim 1, wherein the second frame has at least one medium access control (MAC) header reserved bit that is set to trigger the wireless communication device to employ the first PHY data rate for transmitting the first frame.

5. The wireless communication device of claim 4, wherein said at least one MAC header reserved bit is included in a MAC header address field.

6. The wireless communication device of claim 1, wherein the second frame comprises a sequence control field, and the sequence control field records a sequence number that is set to trigger the wireless communication device to employ the first PHY data rate for transmitting the first frame.

7. The wireless communication device of claim 6, wherein the second frame is a null data frame.

8. The wireless communication device of claim 1, wherein the second frame comprises a network allocation vector (NAV) duration field that is set to trigger the wireless communication device to employ the first PHY data rate for transmitting the first frame.

9. A wireless communication device comprising:
a receiver (RX) circuit, arranged to receive a first frame transmitted at a first physical layer (PHY) data rate from another wireless communication device, wherein the first frame carries channel state information (CSI) data, and the first PHY data rate is higher than a second PHY data rate for acknowledgement (ACK) frame transmission; and
a transmitter (TX) circuit, arranged to transmit a second frame to said another wireless communication device;
wherein the second frame triggers the said another wireless communication device to generate and transmit the first frame to the wireless communication device, and the second frame has at least one PHY preamble reserved bit that is set to trigger said another wireless communication device to employ the first PHY data rate for transmitting the first frame.

10. The wireless communication device of claim 9, wherein the TX circuit is further arranged to transmit a beacon frame to said another wireless communication device, the beacon frame comprises a vendor information element (IE), and the vendor IE indicates that the wireless communication device has the capability of processing the first frame to obtain the CSI data transmitted at the first PHY data rate.

11. The wireless communication device of claim 9, wherein the RX circuit is further arranged to receive a probe request frame send from said another wireless communication device, the TX circuit is further arranged to transmit a probe response frame to said another wireless communication device in response to the probe request frame, the probe response frame comprises a vendor information element (IE), and the vendor IE indicates that the wireless communication device has the capability of processing the first frame to obtain the CSI data transmitted at the first PHY data rate.

12. The wireless communication device of claim 9, wherein the second frame has at least one medium access control (MAC) header reserved bit that is set to trigger said another wireless communication device to employ the first PHY data rate for transmitting the first frame.

13. The wireless communication device of claim 12, wherein said at least one MAC header reserved bit is included in a MAC header address field.

14. The wireless communication device of claim 9, wherein the second frame comprises a sequence control field, and the sequence control field includes a sequence number that is set to trigger said another wireless communication device to employ the first PHY data rate for transmitting the first frame.

15. The wireless communication device of claim 14, wherein the second frame is a null data frame.

16. The wireless communication device of claim 9, wherein the second frame comprises a network allocation vector (NAV) duration field that is set to trigger said another wireless communication device to employ the first PHY data rate for transmitting the first frame.

17. A wireless communication method comprising:
performing channel state information (CSI) estimation for generating CSI data;
transmitting a first frame at a first physical layer (PHY) data rate to a wireless communication device, wherein the first frame carries the CSI data, and the first PHY data rate is higher than a second PHY data rate for acknowledgement (ACK) frame transmission; and
receiving a second frame from the wireless communication device;
wherein the first frame is generated and transmitted to the wireless communication device in response to the second frame, and the second frame has at least one PHY preamble reserved bit that is set to trigger using the first PHY data rate for transmitting the first frame.

* * * * *